CODE TRANSLATING APPARATUS
Filed April 20, 1961
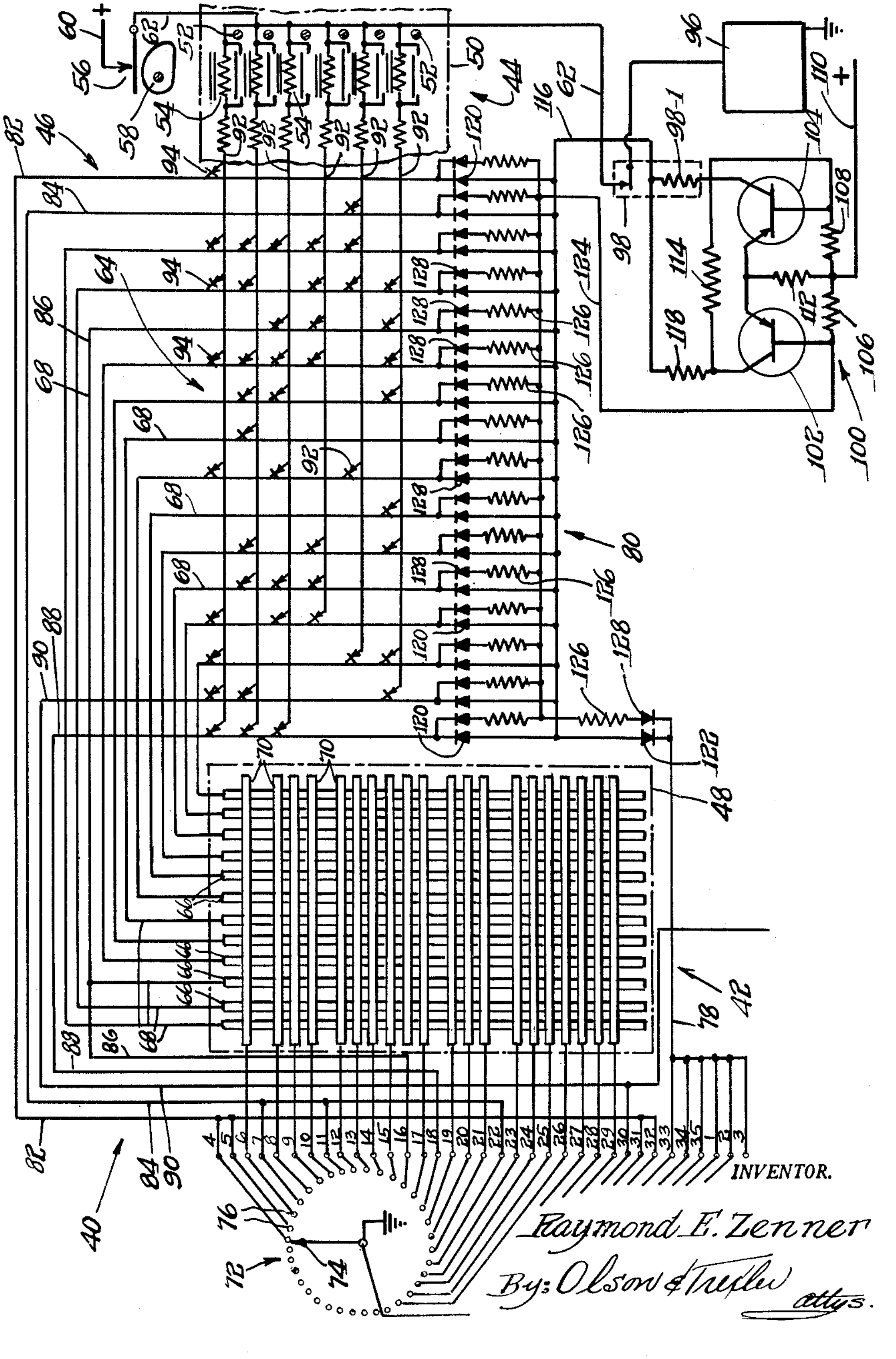
INVENTOR.
Raymond E. Zenner
By: Olson & Trexler attys.

United States Patent Office 3,090,833

Patented May 21, 1963

3,090,833
CODE TRANSLATING APPARATUS

Raymond E. Zenner, San Marino, Calif., assignor, by mesne assignments, to Victor Comptometer Corporation, Chicago, Ill., a corporation of Illinois Filed Apr. 20, 1961, Ser. No. 104,377
6 Claims. (Cl. 178—26)

The present invention relates to apparatus for handling information or data in code, and is directed more particularly to code reading and translating machines.

One object of the invention is to provide improved code controlled apparatus of the above character in which proper operation is assured by improved and highly advantageous safety circuit means which operates dependably to detect abnormalities in code signals operating in the apparatus.

Another object is to provide improved code reading and translating apparatus in which improper operation is automatically detected by improved and highly advantageous circuit means which senses and responds to either the absence of a proper number of code signals or the presence of an excessive number of code signals.

Another object is to provide improved code reading and translating apparatus in which assurance of proper operation is provided by improved detection circuit means which continuously monitors the normal operation of the apparatus to detect and respond to an abnormal number of code signals in the apparatus, while at the same time avoiding interference with normal operation of the apparatus.

Another object is to provide new and improved apparatus of the above character which provides special advantages in the reading of data, punched in one code in one recording body, and in punching the data in a different code in another recording body.

Other objects and advantages will become apparent from the following description of the exemplary embodiment of the invention illustrated diagrammatically in the accompanying drawing.

Many of the mechanical and other components of the disclosed embodiment of the invention are, as such, well known in the art and need not be disclosed in detail here. Accordingly, it is believed that the features of the invention incorporated in the disclosed embodiment can be most readily understood with reference to a diagrammatic illustration of the circuitry, such as that shown in the drawing.

As illustrated diagrammatically in the drawings, the exemplary embodiment of the invention is incorporated into code reading and translating apparatus 40 which operates to read data recorded in one code and to re-record the data in another code. In general, the code handling apparatus illustrated comprises a code reading unit, identified generally by the number 42, a code punching unit 44, and a code translating circuit 46 electrically interconnected between the reading unit 42 and the punching unit 44.

The code reader or reading unit 42 is designed to read data from a card 48 in which data is punched in a business machine code, such for example as the "I.B.M." code of the International Business Machines Corporation. The punching unit 44 is designed to punch data in a telegraphic code in another recording body 50.

In this instance, the code punching unit 44 is designed to punch a succession of bills 50 with data in a telegraphic code, which data is read from a corresponding sequence of successive punched cards 48 moved into the reader 42.

While it is unnecessary for the purposes of the present application to disclose the detailed construction of the punching unit 44, it will be helpful to refer briefly to some of its major components which are illustrated diagrammatically in the drawing.

As illustrated, the punching unit 44 comprises six punches 52 arranged in a straight line. In a single punching cycle, one or more of the punches 52 are operated in unison to punch holes in the coacting recording body or bill 50. Selective operation of the punches 52 is determined by a series of six punch control solenoids 54 arranged to control operation of the respective punches 52. Energization of one of the control solenoids 54 causes the coacting punch 52 to be operated during the next punching cycle.

It will be understood by those skilled in the art that the punching unit 44 includes means for cyclically indexing or advancing the recording body 50 in synchronization with operation of the punches 52. The recording body indexing means, which is not specifically illustrated in the drawing, is connected to intermittently close an energizing switch 56 in synchronism with the successive punching cycles of the punching unit. For the purpose of illustration, the switch 56 is cyclically closed intermittently in timed relation to the successive punching cycles by means of a cam 58 driven in synchronism with the punching unit 44.

The intermittently closed switch 56 connects a power supply conductor 60 to a conductor 62 connected to one side of each of the solenoids 54. In the present instance, the conductor 60 supplies a D.C. power voltage of forty-eight volts.

Upon closure of the power switch 56, which may be regarded as a timing switch, the punch control solenoids 54 are energized selectively through control circuits established through a diode matrix 64 in the translating circuit network 46.

As previously intimated, the translating network 46 is responsive to the card reader 42 which, as such is formed for the most part of conventional components which need not be described here.

As illustrated diagrammatically in the drawing, the card reader 42 comprises a grid of conductors in two sets disposed at right angles to each other. One set of parallel conductors 66 are connected respectively to a corresponding plurality of connecting conductors 68 extending to the diode matrix 64 of the translating network 46. Another set of parallel conductors 70 positioned in the reader 42 in perpendicular overlapping relation to the conductors 66 are connected with coacting terminals of a cycling switch or commutator 72, as will be described in greater detail.

The switch 72 grounds the conductors 70 in a predetermined sequence which is, as will presently appear, automatically coordinated with the indexing movement of a recording body or bill 50 through the punching unit 44, as described.

In the present instance, each recording body or bill 50 punched in the punching unit 44 has a length in the direction in which the body is moved through the punching unit such that thirty-five indexing cycles are required to move an individual bill or recording body through the punching zone in the punching unit. The commutator or grounding switch 72 has thirty-five output terminals, identified in the drawing as 1 through 35 and corresponding to the thirty-five indexing cycles required to move a recording body 50 through the punching zone in the punching unit 44.

Provision is made for leaving substantially blank or unpunched spaces between opposite ends of each recording body or bill 50 punched in the punching unit 44 and the area of the bill in which data is punched in code. For this purpose, a blank space equal to three recording spaces is left at each end of each recording body 50.

Thus, during the first three indexing cycles, of movement of a new recording body through the punching zone, the punch control solenoids 54 are not energized and the punches 52 are not operated. Similarly, during the last three cycles in which a recording body is indexed before leaving the punching zone the solenoids 54 are not energized and the punches 52 are not operated.

The switch or commutator 72 is operated in synchronism with the punching unit 44 and is designed to go through one complete operating cycle during movement of each recording body through the punching unit. As illustrated diagrammatically, the switch 72 comprises a grounded contact 74 which is rotated to successively engage an angular series of thirty-five contacts 76 connected with the respective terminals 1 to 35 previously mentioned. During the last three cycles of indexing movement of a recording body within the punching zone of the punching unit 44, the switch 74 grounds the switch terminals 33, 34 and 35. During the first three cycles in which the next recording body is indexed through the punching zone, the switch 72 grounds the switch terminals 1, 2 and 3.

The six terminals 1, 2, 3, 33, 34 and 35, which correspond to the blank spaces on opposite ends of each recording body, are connected to a common conductor 78 which connects with discriminating or detecting circuit means 80 interconnected with the diode matrix 64 in a manner to be described to respond to the absence of a normal signal within the translating network 46.

Normally, the diode matrix 64 in the translating network 46 energizes an odd number of the punch control solenoids 54, at least one punch control solenoid being energized for each successive operating cycle of the punches 52. The function of the connection of the switch 72 through the conductor 78 with the detecting network 80 will appear presently.

Each recording body 50 is punched not only to record data read from a card 48, but also to produce certain controlling apertures which are punched in each successive recording body 50. As illustrated in the drawing, terminals 4 and 5, 31 and 32 of the grounding switch 72, which correspond to the first two and last two punching cycles for each recording body 50, are connected to a common conductor 82 leading to the diode matrix 64. In a similar manner, switch terminals 7, 11 and 22 are connected to a conductor 84 leading to the diode matrix, and terminals 16, 18 and 30 are connected through conductors 86, 88 and 90 with the diode matrix, all for the purpose of punching standard control apertures in a recording body during corresponding operating cycles of the punching unit 44.

The construction and operation of the card reader 42, as such, is well known to those skilled in the art and need not be described in detail here. The operating structure of the reader 42 is such that upon grounding of one of the conductors 70 in the parallel set of conductors 70 a circuit is established between the grounded conductor and one of the conductors 66 in the series of conductors 66, in accordance with the location with reference to the series of conductors 66 of an aperture punched in the card 48 in alinement with the conductor 70 which is grounded. Reference to grounding is made here, since the coacting sequencing switch 72 is grounded.

Each card 78 is punched in a fashion such that one aperture and only one aperture is alined with each of the conductors 70. Moreover, each of the apertures in the card is alined with one of the conductors 66. Hence, upon grounding or effective energization of one of the conductors 70, one but only one of the conductors 66 should be grounded.

Hence, if upon grounding of one of the conductors 70 none of the conductors 66 is energized, this is indicative of error caused by improper punching of the card, malfunctioning of the reader apparatus or other cause. Similarly, grounding of more than one of the conductors 66 upon grounding of one of the conductors 70 indicates error.

As illustrated, connections from all the conductors 66 as well as from the conductors 82 to 90 are made to the diode matrix 64 where the lack of a proper input signal is automatically sensed by the safety or error detecting network 80.

As previously mentioned, a positive potential is intermittently applied to all of the punch control solenoids 54. The six punch control solenoids 54 are connected respectively to six conductors 92 leading into the diode matrix 64 wherein the individual conductors 92 are connected with the grounding conductors leading to the diode matrix. In the diode matrix 64, the conductors 92 are interconnected with the grounding conductors 68 and 82 to 90 through a pattern of diodes or rectifiers 94 which translates from one code into another the data read from punched cards 48. The interconnections between the grounding conductors and the punch solenoid control conductors 92 is such that each grounding conductor connects with an odd number of the conductors 92, in this instance, one, three, or five.

A suitable card error alarm circuit 96 is provided to make an appropriate response in the event of an erroneous signal response in the reading of a card 48. The circuit 96 can be designed to sound an alarm, stop the apparatus, or provide any other desired action. It is activated through a normally closed relay switch 98 which connects the circuit 96 with the conductor 62 which is intermittently energized through the intermittently closed switch 56. As previously stated, the switch 56 is closed once during each punching cycle of the punching unit 44. However, as will presently appear, the detector or signal discriminating circuit 80 responds to grounding of a single one of the grounding conductors 68 and 82 to 90, to open the relay 98 before the switch 56 closes, thereby preventing operation of the card error circuit 96 when a normal signal is supplied to the diode matrix 64.

The relay 98 is controlled by a trigger circuit 100 which is an astable multivibrator.

The trigger circuit 100 comprises two transistors 102, 104 having bases connected respectively through resistors 106, 108 with a power supply conductor 110 to which a D.C. potential of 48 volts is applied. The conductor 110 connects through a resistor 112 with the emitters of both transistors. The collector of the transistor 102 is connected through a resistor 114 with the base of the transistor 104.

The collector of the transistor 104 connects through the operating coil 98–1 for the relay 98 with a conductor 116 which connects with the collector of the transistor 102 through a resistor 118.

The conductor 116 is connected through a set of diodes or rectifiers 120 with the previously mentioned grounding conductors 68 and 82 to 90, one diode being provided for each grounding conductor. Hence, upon grounding of any one of the grounding conductors 68 and 82 to 90, the conductor 116 is grounded to apply a voltage across the trigger circuit 100. The components of the trigger circuit 100, as thus far described, are related to each other to give the circuit the characteristics of an astable multivibrator, whereby the transistor 104 conducts upon grounding of the conductor 116 to direct current through the relay winding 98–1 to open the relay 98 and preclude operation of the error circuit 96.

It will be noted that the conductor 116 connects through a diode 122 with the conductor 78 to effect opening of the relay 98 when one of the terminals 1 to 3 and 33 to 35 of the switch 72 is grounded, as described.

The base of the transistor 102 and the side of the resistor 106 opposite from the power conductor 110 connect with a conductor 124, which is connected through a group of circuits each containing one resistor 126 and one diode or rectifier 128 with the respective grounding conductors 68 and 82 to 90. The relationship of the components is such that the connection between the conductor 124 and each grounding conductor is made through a resistor 126 and diode 128 in series. The conductor 124 also connects with the conductor 78 through a resistor 126 and diode 128.

Grounding of one of the grounding conductors 68 and 82 to 90 or the conductor 78 establishes a circuit from the conductor 110 to ground, which extends through the resistor 106 and the resistor 126 in series with the grounded conductor. This additional circuit to ground which extends through one of the resistors 126 increases the current flow through the resistor 106 with a consequent increase in the voltage drop across the resistor 106.

However, the effective electrical value of the components is such that the current flow through the resistor 106 and one of the resistors 126 to ground does not stop the effective current flow through the relay coil 98–1. Consequently, the relay 98 is opened as described upon grounding of only a single one of the grounding conductors which constitutes a "normal" signal from the switch 72. Hence, opening of the relay 98 can be accurately described as being the normal response of the trigger circuit 100 to a normal signal from the switch 72.

However, upon grounding of two or more of the grounding conductors, which constitutes an "abnormal" signal from the switch 72, the current flow through the resistor 106 is increased because of the current flowing through two or more of the resistors 126 which are grounded. The effect of this is to cause the astable multivibrator or trigger circuit 100 to operate to effectively discontinue conductance of the transistor 104 and cause conductance of the transistor 102. Consequently, the relay coil 98–1 is not effectively energized and the relay 98 remain closed to activate the error circuit 96 to produce its response which indicates an improper signal. Hence, the effecting of a closed condition of the relay 98 can be accurately described as being the response of the trigger circuit 100 to an abnormal signal from the switch 72.

From the foregoing it will be appreciated that the relay coil 98–1 is energized by circuit means which includes the relay coil 98–1 and conducts in a circuit through the relay coil 98–1 only when a circuit is established through one of the conductors 68 and 82 to 90 to the sequencing switch 72 as described. The circuit means which energizes the relay coil 98–1 includes a part of the trigger circuit 100 and comprises the conductor 110, resistors 108 and 112, transistor 104, relay coil 98–1, and conductor 116. The trigger circuit 100 as a whole constitutes circuit means which responds to a predetermined voltage drop across the resistor 106 to stop effective energizing conductance through the relay coil 98–1 even when one of the conductors 66 and 82 to 90 is connected to the sequencing switch 72.

The circuitry thus provided is inherently capable of operating dependably and reliably over a long service life without disturbing the normal operation of the over-all apparatus when it is operating without error.

It will be understood that the invention is not necessarily limited to use of the particular structure illustrated but includes the use of variants and alternatives within the spirit and scope of the invention as defined by the claims.

The invention is claimed as follows:

1. In apparatus for handling information in code, the combination of a plurality of signal conductors a potential source having a voltage bias relative to said conductors, a first resistor connected in series with said potential source, a plurality of second resistors connected between said first resistor and said respective conductors, means for completing circuits from said voltage source through said conductors selectively whereby the voltage drop across said first resistor is a function of the number of conductors through which circuits from said voltage source are established simultaneously, first circuit means coupled with all of said conductors to conduct only when a circuit is established through at least one of said conductors, second circuit means controlled by the voltage drop across said first resistor and coacting with said first circuit means to effectively stop conductance of the latter when the voltage drop across said first resistor exceeds a predetermined value in response to completion of circuits through a predetermined plurality of said conductors, and a safety circuit coacting with said first circuit means to produce in the safety circuit a predetermined control condition only when said first circuit is conducting.

2. In code translating apparatus, the combination of a first series of code signal conductors, a second series of code signal conductors, a plurality of rectifiers connecting conductors of said first series selectively with conductors of said second series, a trigger circuit connected with all of said conductors of said first series to conduct effectively through a predetermined circuit path in response to energization of any conductor of said first series, said trigger circuit including means connected through a plurality of impedances with said respective conductors of said first series to effectively terminate the current flow through said circuit path in response to energization of more than a predetermined number of said conductors of said first series, and a safety circuit controlled by said trigger circuit to produce a response indicating a proper signal only when an effective current is flowing through said path.

3. In apparatus for handling information in code, the combination of a plurality of signal conductors selectively energized by code signals, a potential source having a voltage bias relative to said conductors, a first impedance connected in series with said potential source, a plurality of second impedances connected between said first impedance and said respective conductors, means for completing circuits from said voltage source through said conductors selectively whereby the voltage drop across said first impedance is a function of the number of conductors through which circuits from said voltage source are established simultaneously, a trigger circuit including said first impedance and being connected between said potential source and all of said conductors to conduct through a predetermined path only when a circuit is established through at least one of said conductors, said trigger circuit including circuit means controlled by the voltage drop across said first impedance to effectively stop conductance through said path when the voltage drop across said first impedance exceeds a predetermined value in response to completion of circuits through a predetermined plurality of said conductors, and a safety circuit responsive to the current flow in said path.

4. In apparatus for handling information in code, the combination of a plurality of signal conductors selectively energized by code signals, a potential source having a voltage bias relative to said conductors, a trigger circuit connected between said potential source and all of said conductors to conduct through a first circuit path in response to energization of any one of said conductors, said trigger circuit being connected through a plurality of impedances with said respective conductors to conduct current through a second circuit path at a rate determined by the number of said conductors which are energized simultaneously, said trigger circuit including circuit means responsive to current flow in said second circuit path in excess of a predetermined value to effectively terminate current flow through said first path, and a safety circuit controlled by said trigger circuit to produce in the safety circuit a predetermined control condition only when an effective current is flowing through said first path.

5. In code reader-translating apparatus, the combination of code reading means having a series of input conductors, a series of reader output conductors, and reader means for connecting said input conductors with said reader output conductors selectively in accordance with code apertures in a punched recording body; code translator means having a series of translator output conductors connected selectively with said reader output conductors by rectifiers included in the code translator means, a plurality of code punch controls controlled by said translator output conductors, a trigger circuit connected with all of said reader output conductors to conduct effectively through a predetermined circuit path in response to energization of any reader output conductor, said trigger circuit including means connected through a plurality of impedances with said respective reader output conductors to respond to energization of more than a predetermined number of said reader output conductors to effectively terminate the current flow through said circuit path, and a safety circuit coupled with said trigger circuit to be controlled by the flow of current through said path.

6. In apparatus for handling information in code, the combination of a plurality of conductors for transmitting code signals, a safety circuit having a first condition which manifests an improper code signal and a second condition which manifests a proper code signal, trigger circuit means connected with said conductors and defining a circuit path connected to said conductors by means which produces through said path a flow of current which is proportional to the number of said conductors that are energized, said trigger circuit means being connected in controlling relation to said safety circuit to establish in the safety circuit said second condition only in response to energization of at least one of said conductors and to establish in said safety circuit said first condition in response to the flow through said path of current in excess of a predetermined value corresponding to energization of more than one of said conductors.

References Cited in the file of this patent

UNITED STATES PATENTS

| | | |
|---|---|---|
| 1,962,750 | Read | June 12, 1934 |
| 2,719,959 | Hobbs | Oct. 4, 1955 |
| 2,737,647 | Oliwa | Mar. 6, 1956 |
| 2,828,450 | Pinckaers | Mar. 25, 1958 |
| 2,939,124 | Saxenmeyer | Mar. 31, 1960 |